US012573296B2

(12) United States Patent
Teraguchi et al.

(10) Patent No.: US 12,573,296 B2
(45) Date of Patent: Mar. 10, 2026

(54) ROAD INFORMATION DISPLAY SYSTEM AND METHOD

(71) Applicant: NISSAN NORTH AMERICA, INC., Franklin, TN (US)

(72) Inventors: Takehito Teraguchi, Cupertino, CA (US); Stefan Witwicki, San Carlos, CA (US); Erik St Gray, Tacoma, WA (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 185 days.

(21) Appl. No.: 17/978,102

(22) Filed: Oct. 31, 2022

(65) Prior Publication Data

US 2024/0144821 A1 May 2, 2024

(51) Int. Cl.
*G08G 1/0967* (2006.01)

(52) U.S. Cl.
CPC . *G08G 1/096791* (2013.01); *G08G 1/096775* (2013.01)

(58) Field of Classification Search
CPC ....... G08G 1/096791; G08G 1/096775; G08G 1/096716; G08G 1/096741
See application file for complete search history.

(56) References Cited

U.S. PATENT DOCUMENTS 10,134,278 B1 * 11/2018 Konrardy ............... G08G 1/166
11,180,159 B1 * 11/2021 Post ......................... G08G 1/04
11,830,357 B1 * 11/2023 Murphy ............... G08G 1/0145
2008/0316021 A1 * 12/2008 Manz ..................... G16H 40/67 340/539.13
2010/0207787 A1 * 8/2010 Catten .............. G08G 1/096716 340/905
2015/0191122 A1 * 7/2015 Roy ................. G08G 1/096827 340/439
2016/0042644 A1 * 2/2016 Velusamy ........ G08G 1/096775 340/435
2016/0057335 A1 * 2/2016 Pisz ....................... H04N 23/64 348/149
2016/0078491 A1 * 3/2016 Kennewick, Sr. ........................... G06Q 30/0264 705/7.18
2017/0048589 A1 * 2/2017 Bayer ................... G06F 16/435
2017/0257337 A1 * 9/2017 Hampson ................ H04L 51/08
2018/0348000 A1 * 12/2018 Cai ....................... G01C 21/367
2019/0082377 A1 * 3/2019 Silver ................ G08G 1/09675
2021/0248908 A1 * 8/2021 Sato ....................... G08G 1/012
2022/0028264 A1 * 1/2022 Lund ................ G08G 1/096783
2023/0221569 A1 * 7/2023 Ohyama ................ B60K 35/00 701/523
2025/0124791 A1 * 4/2025 Menard ................ G08G 1/0112

* cited by examiner

*Primary Examiner* — Jason Holloway
*Assistant Examiner* — Madison B Emmett
(74) *Attorney, Agent, or Firm* — Spencer Fane, LLP

(57) ABSTRACT

A method of displaying road information in a host vehicle includes receiving with the host vehicle the road information acquired by another vehicle. The road information includes information about a portion of a road ahead of a current portion of the road upon which the host vehicle is traveling. An information presentation time is determined at which the road information is configured to be presented in the host vehicle. The road information is presented in the host vehicle at the determined information presentation time.

15 Claims, 7 Drawing Sheets

ROAD INFORMATION DISPLAY SYSTEM AND METHOD

BACKGROUND

Technical Field

The present disclosure generally relates to a road information display system and method. More specifically, the present disclosure relates to system and method of displaying road information about a portion of a road ahead of a current portion of the road upon which the host vehicle is traveling.

Background Information

Driving unfamiliar roads or roads with poor visibility can induce stress in a driver of a vehicle. Traffic signs and other road information, when visible, do not accurately depict the road ahead of the vehicle. Additionally, traffic signs do not convey information regarding a current situation on the road ahead of the vehicle, such as an accident around a sharp turn that is not visible to the driver prior to traveling through the sharp turn.

SUMMARY

In view of the state of the known technology, one aspect of the present disclosure is to provide a method of displaying road information in a host vehicle. The host vehicle receives the road information acquired by another vehicle. The road information includes information about a portion of a road ahead of a current portion of the road upon which the host vehicle is traveling. An information presentation time is determined at which the road information is configured to be presented in the host vehicle. The road information is presented in the host vehicle at the determined information presentation time.

Another aspect of the present disclosure is to provide a road information display system for a host vehicle including a receiver, a processor and an information display. The receiver is configured to receive road information acquired by another vehicle. The road information includes information about a portion of a road ahead of a current portion of the road upon which the host vehicle is traveling. The processor is configured to determine an information presentation time. The information display is configured to present the road information in the host vehicle at the determined information presentation time. The processor is further configured to prevent the presentation of the road information in the host vehicle prior to the information presentation time.

Also other objects, features, aspects and advantages of the disclosed road information display system and method will become apparent to those skilled in the art from the following detailed description, which, taken in conjunction with the annexed drawings, discloses exemplary embodiments of the road information display system and method.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
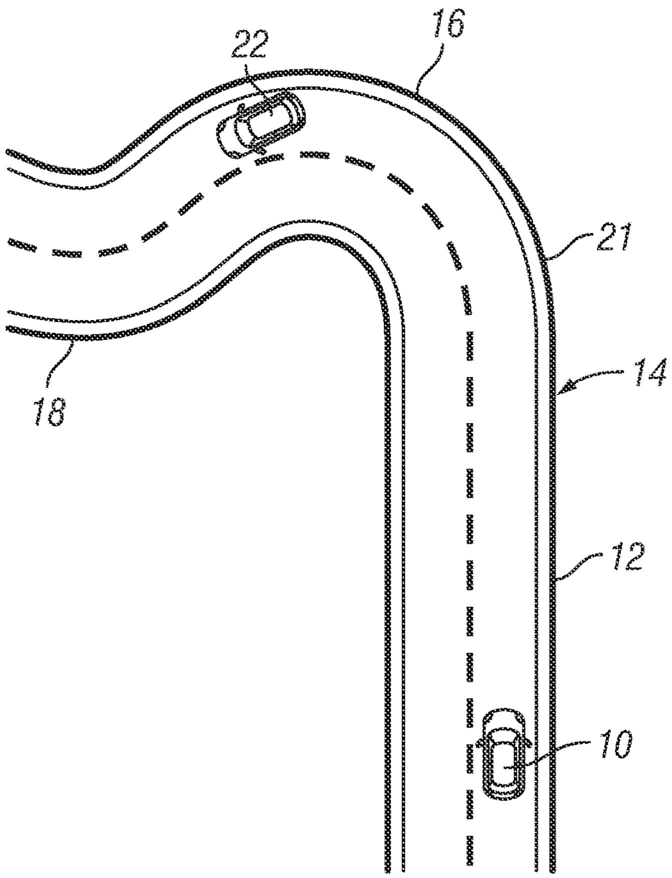
FIG. 1 is a schematic illustration of a road information display system and method in accordance with an exemplary embodiment.

As shown in FIG. 1, the driver of a host vehicle 10 is traveling along a current, straight portion 12 of a road 14. The road 14 includes a sharp turn 16 ahead of the current portion 12 of the road 14 on which the vehicle is traveling. When the driver of the host vehicle 10 is unfamiliar with the road, when there is poor visibility, or when a traffic sign does not accurately depict the curvature of the road, navigating the sharp turn 16 can be difficult for the driver of the host vehicle 10. Other road situations, such as winding mountain roads or steep grades, can also provide difficult driving situations for the driver of the host vehicle 10.

Figure 2:
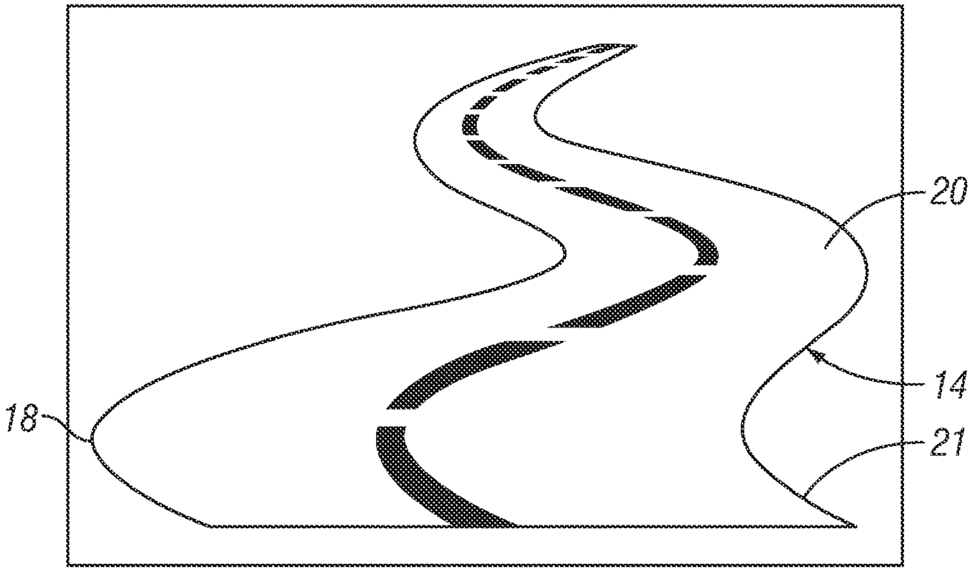
FIG. 2 is a schematic illustration of road information acquired by another vehicle.

As shown in FIG. 2, the road 14 includes additional turns 18 and 20 after the sharp turn 16, increasing the difficulty of navigating the road 14. The sharp turn 16 and the additional turns 18 and 20 are portions 21 of the road 14 ahead of the current portion 12 of the road 14 traveled by the host vehicle 10. Receiving road information from another vehicle 22 navigating the portion 21 of the road 14 ahead of the host vehicle 10 prior to the host vehicle 10 traveling the portion 21 of the road 14 ahead of the host vehicle 10 provides information to the driver of the host vehicle 10 that facilitates controlling the host vehicle 10 through the portion 21 of the road 14. The road information received from the other vehicle 22 can provide information regarding how sharp the turn 16 is, whether there are additional turns 18 and 20 after the sharp turn 16, whether there is an accident or obstruction after the sharp turn 16, or any other road information that facilitates controlling the host vehicle 10 prior to the host vehicle 10 traveling the sharp turn 16 and the subsequent turns 18 and 20 after the sharp turn 16. In other words, receiving road information regarding a portion of the road 14 ahead of the current portion of the road 14 traveled by the host vehicle 10 facilitates the driver of the host vehicle preparing to operate the host vehicle 10 through the portion 21 of the road 14.

Figure 3:
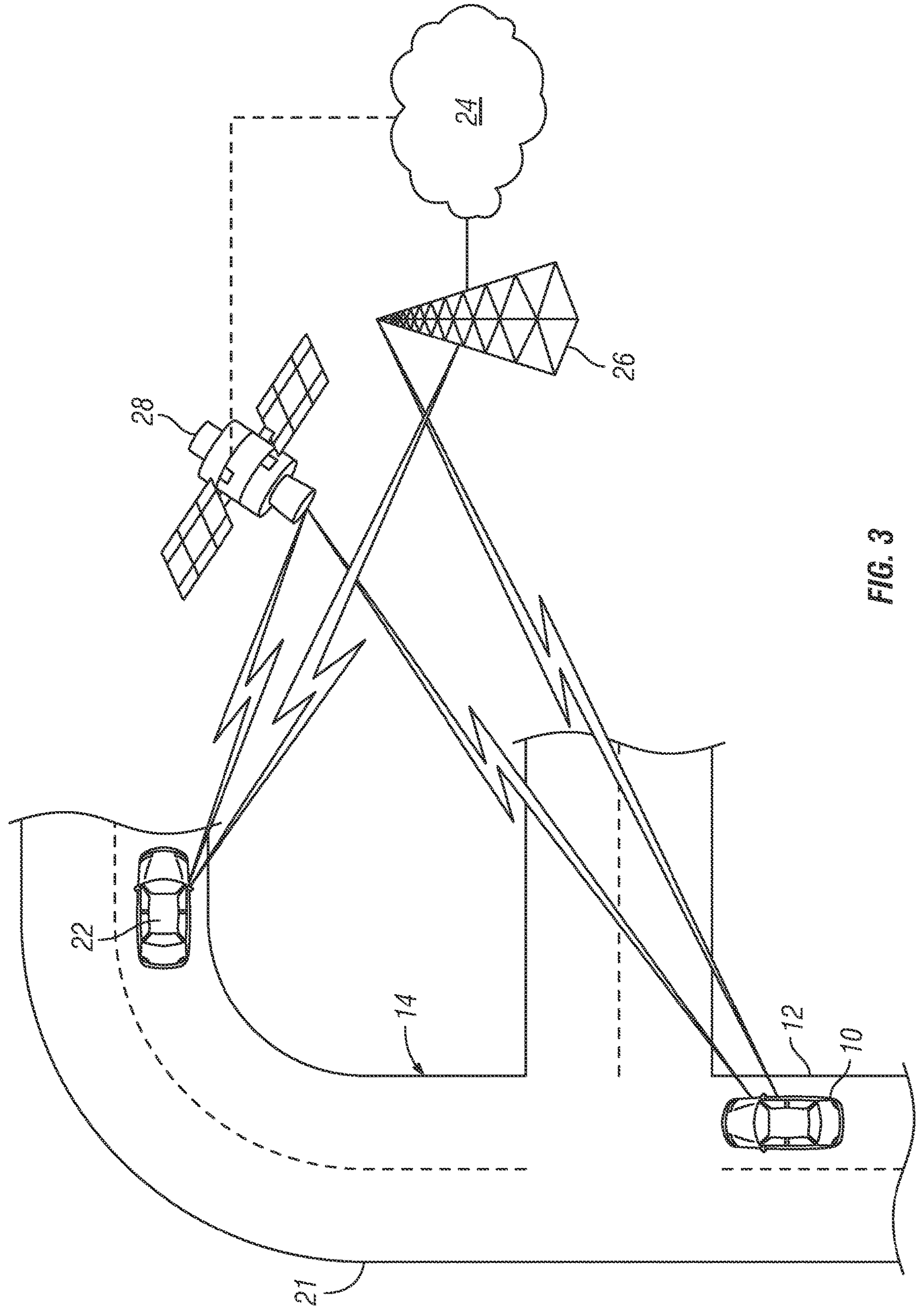
FIG. 3 is a schematic illustration of a communication system of the road information display system and method of FIG. 1.
Figure 4:
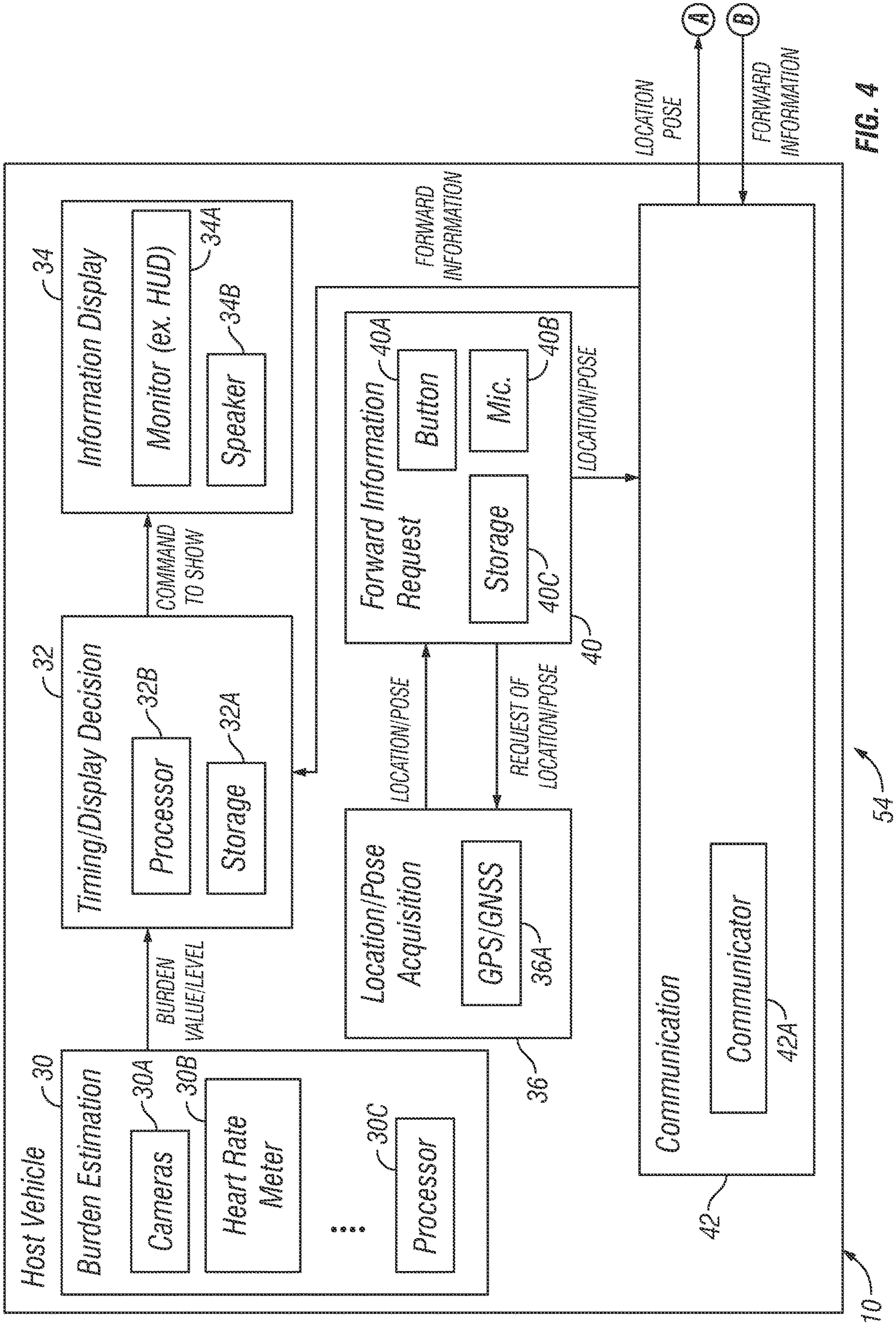
FIG. 4 is a schematic illustration of a portion of the road ahead of the current portion of the road upon which a host vehicle is traveling.
Figure 4:
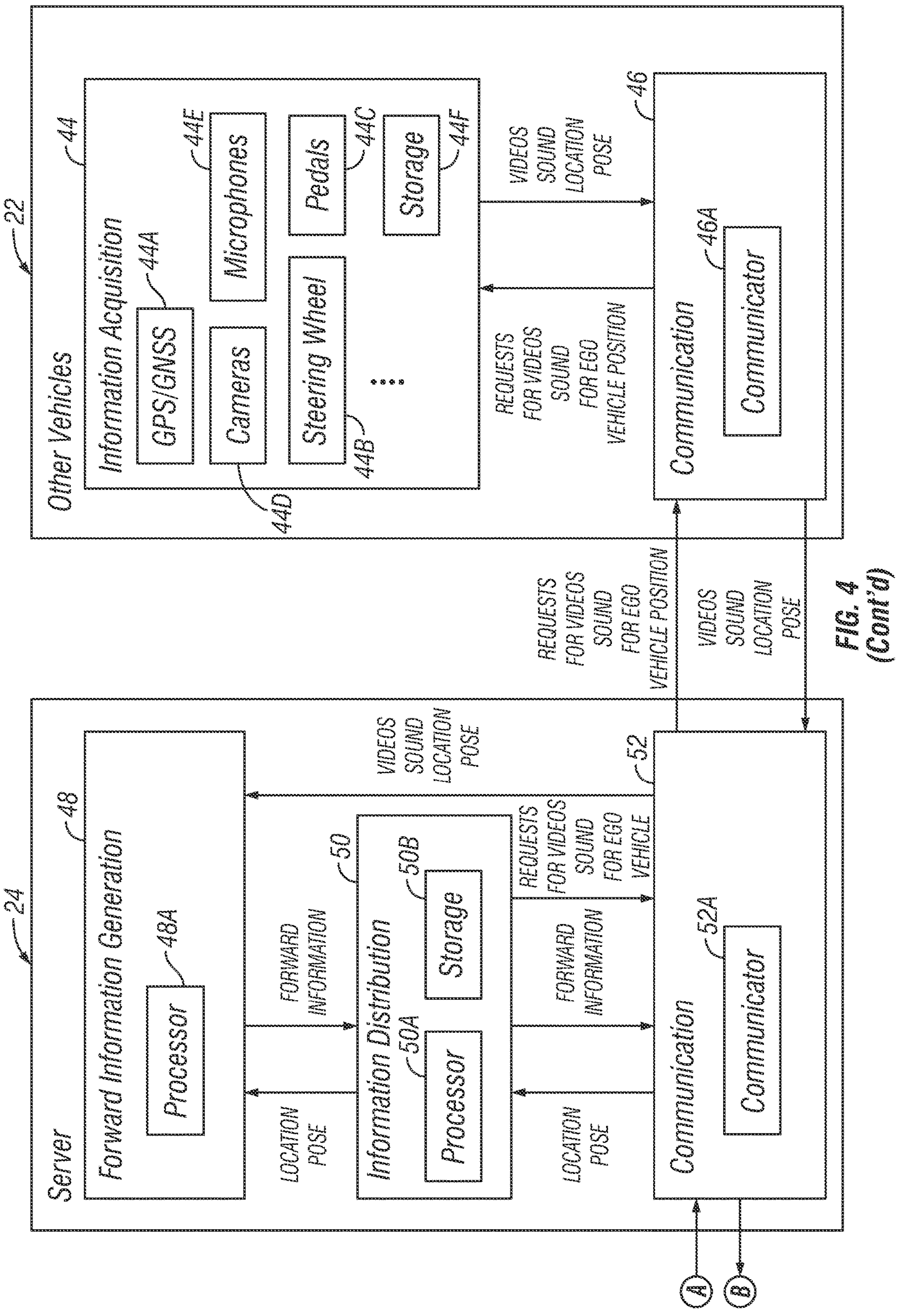

As shown in FIGS. 3 and 4, the host vehicle 10 and the other vehicle 22 are in wireless communication with a communication network 24 to upload and receive the road information regarding information about a portion 21 of the road 14 ahead of the current portion 12 of the road 14 that the host vehicle 10 is currently traveling.

The host vehicle 10 and the other vehicle 22 may communicate with the communication network, or remote server, 24 via an access point 26, as shown in FIG. 3. The access point 26, which may include a computing device, may be configured to communicate with the host vehicle 10, the other vehicle 22, the communication network 24, or with a combination thereof via wired or wireless communication links. For example, the access point 26 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 3, the access point 26 may include any number of interconnected elements.

The host vehicle 10 and the other vehicle 22 may communicate with the communication network, or remote server, 24 via a satellite 28, or other non-terrestrial communication device. The satellite 28, which may include a computing device, may be configured to communicate with the host vehicle 10, the other vehicle 22, with the communication network 24, or with a combination thereof via one or more communication links. Although shown as a single unit in FIG. 3, the satellite 28 may include any number of interconnected elements.

The electronic communication network, or remote server, 24 may be any type of network configured to provide for voice, data, or any other type of electronic communication. For example, the electronic communication network 24 may include a local area network (LAN), a wide area network (WAN), a virtual private network (VPN), a mobile or cellular telephone network, the Internet, a cloud server, a remote database, or any other electronic communication system. The electronic communication network 24 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 3, the electronic communication network 24 may include any number of interconnected elements.

As shown in FIG. 4, the host vehicle 10 is schematically illustrated including a plurality of control modules. The host vehicle 10 includes a burden estimation unit 30, a presentation determination unit 32, an information display 34, a navigation system 36, a road information request unit 40, and a communication unit 42.

As shown in FIG. 4, the other vehicle 22 is schematically illustrated including a plurality of control modules. The other vehicle 22 includes an information acquisition unit 44 and a communication unit 46.

The electronic communication network 24 is schematically illustrated including a plurality of control modules. The electronic communication network 24 includes a road information generation unit 48, an information distribution unit 50 and a communication unit 52, as shown in FIG. 4.

Each of the communication units 42, 46 and 52 includes a wireless communicator 42*a*, 46*a* and 52*a*, respectively, as shown in FIG. 4. The term "wireless communicator" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, or Bluetooth communications or any other type of signal suitable for wireless communications as understood in the vehicle field. Here, the wireless communication communicator can be a two-way wireless communication unit having a receiver and a transmitter. The wireless communicator 42*a* of the communication unit 42 of the host vehicle 10 is configured to communicate with the wireless communicator 52*a* of the communication unit 52 of the electronic communication network 24. The wireless communicator 46*a* of the communication unit 46 of the other vehicle 22 is configured to communicate with the wireless communicator 52*a* of the communication unit 52 of the electronic communication network 24.

The road information display system 54 includes the host vehicle 10, the other vehicle 22, and the electronic communication network 24, as shown in FIG. 4. Although the other vehicle 22 is described herein as being one vehicle, the other vehicle 22 can include a plurality of vehicles transmitting road information to the electronic communication network 24. The road information display system 54 displays the road information in the host vehicle 10 received from the other vehicle 22 that is traveling a portion 21 of the road 14 ahead of a current portion 12 of the road 14 upon which the host vehicle 10 is traveling. The road information received by the host vehicle 10 includes an image and/or a sound providing information regarding the portion 21 of the road 14 ahead of the current portion 12 of the road traveled by the host vehicle 10.

The road information includes dynamic and static information of the portion 21 of the road 14 ahead of the current location of the host vehicle 10. Dynamic road information is road information that is subject to change overtime. Dynamic road information includes, but is not limited to, a slow vehicle (e.g., a truck or trailer), an emergency vehicle, a stopped vehicle or traffic jam, a bicyclist or jaywalker, debris on the road, or an animal on the road. Static road information is road information that does not change with time. Static road information includes, but is not limited to, a blind driveway or road, a sharp or hairpin turn, a portion of the road with no shoulder, and a portion of the road having a steep drop-off. The road information can also include information that is not dynamic or static road information, such as, but not limited to, construction work on the road.

Figure 8:
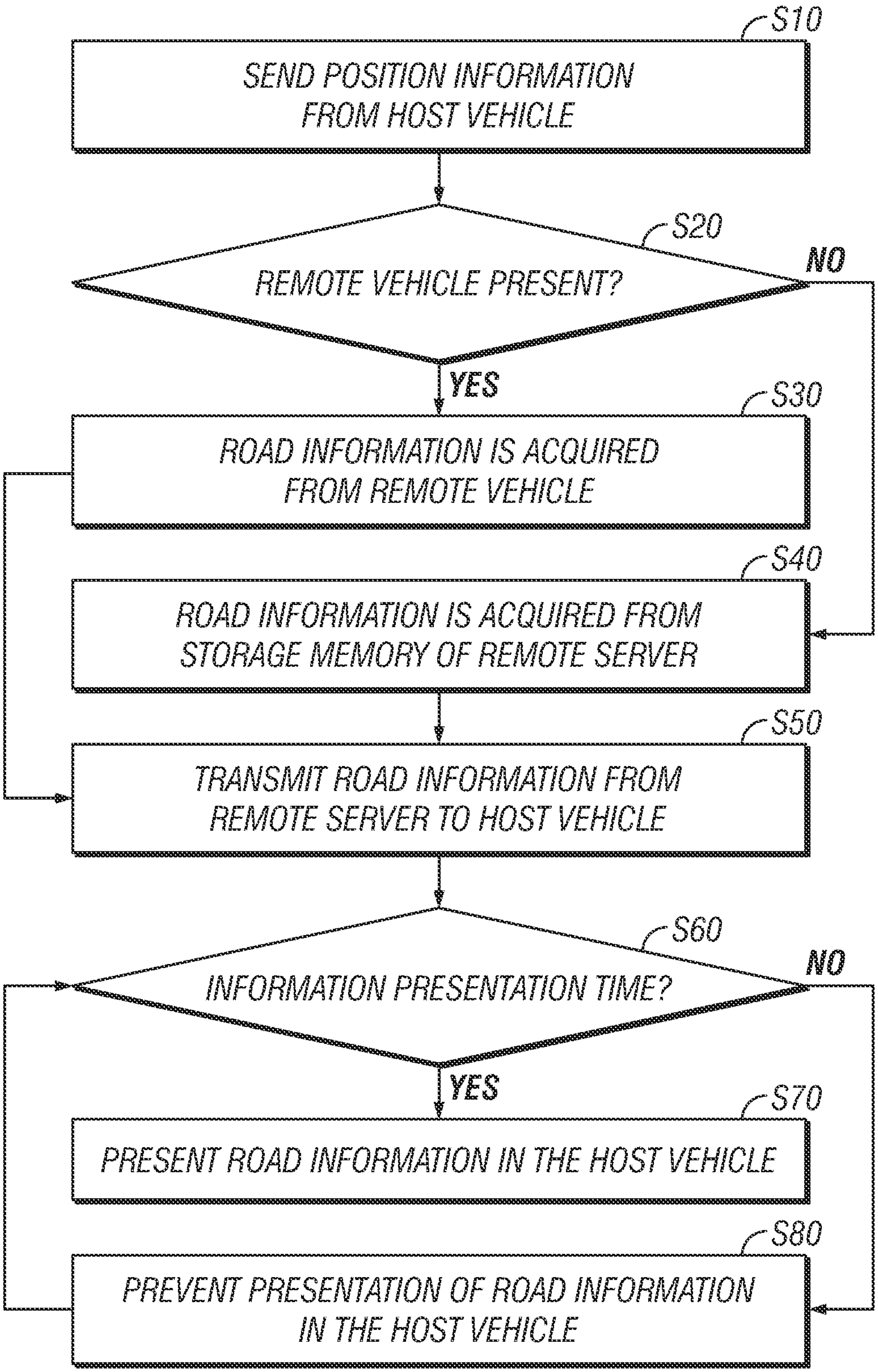
FIG. 8 is a flowchart of the road information display system and method of FIG. 1.

A flow chart of a method of displaying road information in the host vehicle 10 is illustrated in FIG. 8. In step S10 of FIG. 8, the host vehicle 10 sends position information of the host vehicle 10 to the electronic communication network 24. The position information of the host vehicle 10 includes, but is not limited to, a location, a position and a heading of the host vehicle 10. The position information of the host vehicle 10 is determined by the navigation system, or a location/pose acquisition unit, 36 of the host vehicle 10, as shown in FIG. 4. The navigation system 36 includes a global positioning system (GPS) or a global navigation satellite system (GNSS) 36*a* to determine the position information of the host vehicle 10.

The position information is determined when the host vehicle 10 is approaching a known difficult or risky portion of the road 14 or when the driver requests the road information to be displayed. As shown in FIG. 4, the host vehicle 10 includes a road information request unit 40. The road information request unit 40 includes an operating member, such as a button, 40A and a microphone 40B through which the driver can request the road information to be transmitted from the electronic communication network 24. The operating member 40A can be manually activated or a command spoken and received by the microphone 40B to initiate receiving the road information from the electronic communication network 24. The road information request unit 40 further includes a storage 40C that stores locations of the known difficult or risky portions of the road 14. The known difficult or risky portions of the road 14 can be manually stored by the driver of the host vehicle 10 when previously traveling the road 14 or can be locations received from the electronic communication network 24 indicated by being difficult or risky by other vehicles 22.

When the driver manually requests road information, the road information request unit 40 transmits a request for the current position information of the host vehicle 10, which is transmitted to the road information request unit 40. Alternatively, the road information request unit 40 transmits a request for the current position information of the host vehicle to determine whether the host vehicle 10 is within a predetermined distance and traveling toward a stored location. The current position information of the host vehicle 10 is transmitted from the road information request unit 40 to the communication unit 42. The wireless communicator 42A of the communication unit 42 of the host vehicle 10 transmits the current position information of the host vehicle 10 to the wireless communication 52A of the communication unit 52 of the electronic communication network 24.

When the electronic communication network 24 receives the position information from the host vehicle 10, the process moves to step S20 of FIG. 8 in which the electronic communication network 24 determines whether another, or remote, vehicle 22 is present on the same road 14 and heading in the same direction ahead of the current location of the host vehicle 10. The position of the host vehicle 10 is transmitted to a processor 50A of the information distribution unit 50. The processor 50A communicates with a storage 50B of the information distribution unit 50 to determine whether another vehicle 22 is in traveling the same road 14 in the same direction and ahead of the current location of the host vehicle 10. When another vehicle 22 is determined to be traveling in the same direction on the same road 14 and ahead of the current location of the host vehicle 10, the information distribution unit 50 transmits a signal to the wireless communicator 52A to transmit a request for road information to the other vehicle 22. When another vehicle 22 is not present on the same road 14, traveling in the same direction and ahead of the current location of the host vehicle 10, road information is obtained from the storage 50B of the information distribution unit 50.

When another vehicle 22 is determined to be present in the vicinity of the current location of the host vehicle 10, the process moves to step S30 of FIG. 8. In step S30, the road information is acquired from the other vehicle 22. As shown in FIG. 4, the wireless communicator 52A transmits a request for the road information to the wireless communicator 46A of the other vehicle 22 determined to be traveling the same road 14 in the same direction and ahead of the current location of the host vehicle 10.

The wireless communicator 46A of the communication unit 46 transmits a request to the information acquisition unit 44 of the other vehicle 22, as shown in FIG. 4. The information acquisition unit 44 includes a plurality of information acquiring components configured to obtain the road information. The information acquisition unit 44 includes a navigation system 44A, a steering wheel 44B and pedals 44C, which are configured to provide position information of the other vehicle 22 and information regarding operation of the steering wheel 44B and pedals 44C of the other vehicle 22 as the other vehicle travels through a portion 21 of the road 14 ahead of the current location of the host vehicle 10. The information acquisition unit 44 further includes a camera 44D to capture an image or video of the portion of the road 14 traveled by the other vehicle 22. The information acquisition unit 44 further includes a microphone 44E such that an occupant of the other vehicle 22 can record audio describing the portion of the road 14 traveled by the other vehicle 22. The information acquisition unit 44 can further include a storage 44F to store the road information acquired by the components of the information acquisition. The road information acquired by the other vehicle 22 includes at least one of a visual image and an audible message. The visual image can be an image or a video. The visual image can be an image of the sharp turn 16 (FIG. 1) in the road 14. The audible message can be a message from the driver of the other vehicle 22 with a description of the sharp turn 16 in the road 14. The road information acquired by the information acquisition unit 44 is transmitted to the wireless communicator 46A responsive to the request signal. The wireless communicator 46A transmits the road information to the wireless communicator 52A of the electronic communication network 24.

The wireless communicator 46A of the electronic communication network 24 transmits the road information received from the other vehicle 22 to the road information generation unit 48, as shown in FIG. 4. The road information generation unit includes a processor 48A configured to process the road information received from the other vehicle 22. The forward information is transmitted from the processor 48A to the information distribution unit 50A. The forward information can be stored in the storage 50B of the information distribution unit 50 or can be transmitted to the wireless communicator 52A to be transmitted to the host vehicle 10.

When another vehicle 22 is determined to not be traveling on the same road 14 in the same direction and ahead of the current location of the host vehicle 10, the process moves to step S40 of FIG. 8 in which the road information is acquired from the electronic communication network, or remote server, 24. The position information of the host vehicle 10 transmitted to the wireless communicator 52A of the electronic communication network 24 is transmitted to the processor 50A of the information distribution unit 50. The processor 50A determines whether road information associated with the position information of the host vehicle 10 is stored in the storage 50B of the information distribution unit 50. The stored road information is transmitted to the processor 48A of the road information generation unit 48. The road information is stored in the storage 50B of the electronic communication network for a predetermined amount of time, such as twenty-four hours. The storage 50B can store multiple views of the same portion of the road 14, such that the appropriate view is transmitted to the host vehicle 10, such as a nighttime view when the host vehicle 10 is traveling at night. When the storage 50B of the information distribution unit 50 does not have road information associated with the current position information of the host vehicle 10, basic information stored in the storage 50B, such as a speed limit, is transmitted to the host vehicle 10.

The processor 48A of the road information generation unit 48 generates the road information from the road information transmitted from the other vehicle 22 or from the information stored in the storage 50B of the information distribution unit 50. The processor 48A is configured to adjust the image or the video of the road information to account for a change in time of the day or weather. For example, when the host vehicle 10 requests road information at night and the road information is obtained from the storage 50B of the information distribution unit based on road information transmitted from another vehicle 22 during daytime, the processor 48A is configured to adjust the video or image from daytime to nighttime. In other words, the visual image of the received road information is modified to correspond to a current time of day or a current weather condition.

From steps S30 and S40 of FIG. 8, the process moves to step S50 in which the road information is transmitted from the electronic communication network 24 to the host vehicle 10. As shown in FIG. 4, the road information is transmitted from the information distribution unit 50 to the wireless communicator 52A of the electronic communication network 24, which transmits the road information to the wireless communicator 42A of the host vehicle 10. The road information is then transmitted to and stored in a storage 32A of the presentation determination unit 32.

The process then moves to step S60 of FIG. 8 in which a time to present the road information in the host vehicle 10 is determined. A processor 32B is configured to determine an information presentation time at which the road information is presented in the host vehicle 10 based on information obtained by the burden estimation unit 30. Additionally, the driver can store preferences regarding when and how to display the road information. When the presentation determination unit 32 determines that the road information is to be displayed in accordance with the information presentation time in step S60, the process moves to step S70. When the presentation determination unit 32 determines that the road information should not be displayed in accordance with the determined information presentation time in step S60, the process moves to step S80 in which the road information is prevented from being displayed in the host vehicle 10.

The burden estimation unit 30 includes a camera 30A, a heart rate monitor 30B, and any other suitable component to detect information regarding indications of stress, burden or discomfort exhibited by the driver of the host vehicle 10. The camera 30*a* is configured to detect visible stress and/or discomfort exhibited by the driver, such as squinting of the eyes due to poor visibility of the road 14. The heart rate monitor 30B is configured to detect the heart rate of the driver of the host vehicle 10 to determine when a stress level of the driver is increasing. The information collected by the camera 30A, the heart rate monitor 30B, and the other stress detecting components is transmitted to a processor 30C to determine whether the driver is experiencing stress or an elevated burden while operating the host vehicle 10. In other words, the burden of the driver of the host vehicle 10 is determined with a sensor, such as the camera 30A or the heart rate monitor 30B, disposed in the host vehicle 10.

The processor 32B receives the burden level determined by the processor 30C of the burden estimation unit 30. Based on the determined burden level, the presentation determination unit determines when to display the road information. When the estimated burden level is high, the road information is displayed sooner than when the estimated burden level is low such that the driver has more time to process the received road information prior to operating the host vehicle 10 through the portion 21 of the road 14 ahead of the current portion 12 of the road 14 traveled by the host vehicle 10.

Figure 5:
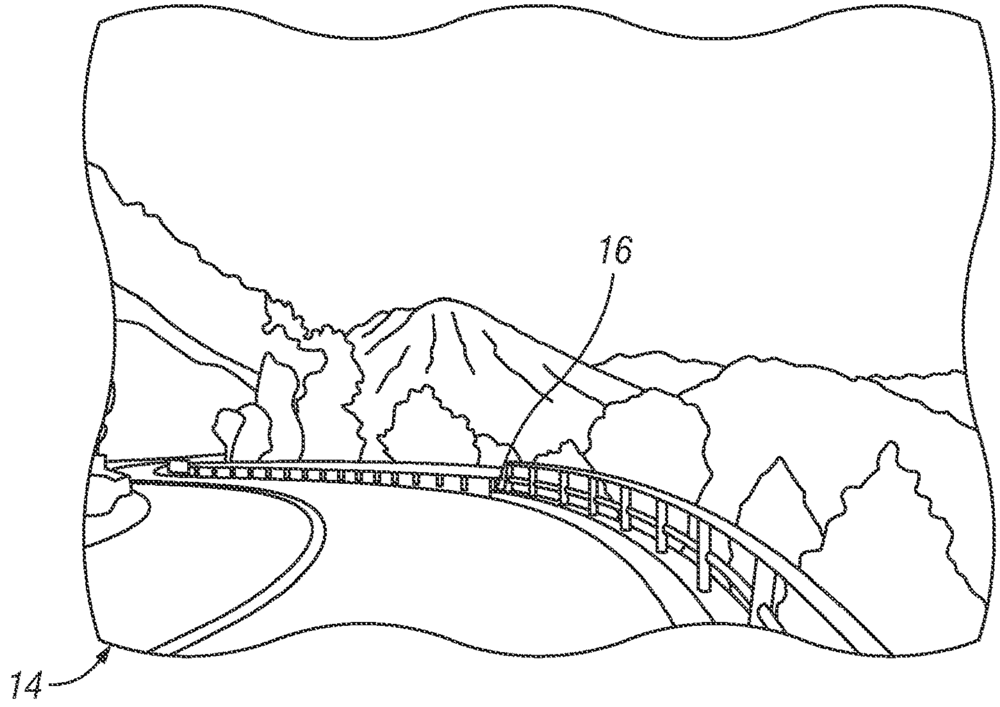
FIG. 5 is a schematic illustration of another portion of the road ahead of the current portion of the road upon which a host vehicle is traveling.
Figure 7:
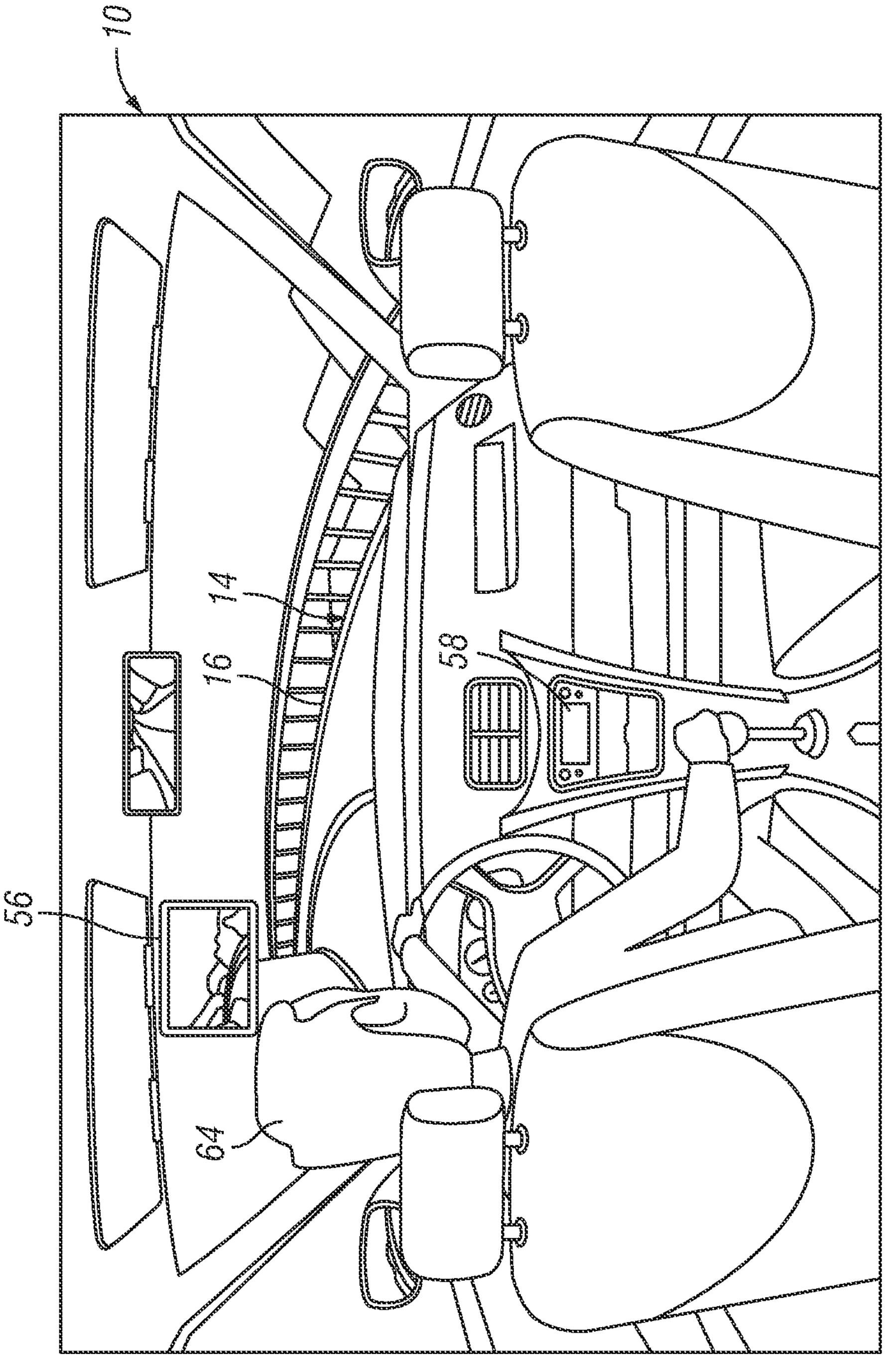
FIG. 7 is a schematic illustration of the system architecture of the road information display system and method of FIG. 1.

In step S70, the road information is displayed in the host vehicle 10. As shown in FIG. 4, the road information display 34 includes at least one of a monitor 34A and a speaker 34B. The monitor 34A displays the received road information in a convenient position for the driver. The monitor 34A can be a heads-up display (HUD) 56, as shown in FIG. 7. Alternatively, the received road information can be displayed on a display screen 58. Audio included with the road information is played through speakers 34B mounted in the host vehicle 10. The received road information includes information about a portion 21 of the road 14 ahead of a current portion 12 of the road 14 upon which the host vehicle 10 is traveling. As shown in FIGS. 1 and 5, the road information includes an image of the sharp turn 16 in the road 10 ahead of the current portion 12 of the road 14 upon which the host vehicle 10 is traveling. The image of the sharp turn 16 is captured by the camera 44D of the other vehicle 22 while traveling the sharp turn ahead of the host vehicle 10. As shown in FIG. 7, the image of the sharp turn 16 is displayed in the heads-up display 16. Any audio included with the road information captured by the other vehicle 22 is presented through the speakers 34B of the host vehicle 10. In other words, the received road information presented in the host vehicle 10 includes at least one of a visual image and an audible message.

In step S80, the road information is prevented from being presented in the host vehicle 10 prior to the determined information presentation time. The information presentation time is determined in step S60. Prior to the information presentation time, the received road information is prevented from being displayed in the host vehicle 10. The process returns to step S60 to determine whether the time is the information presentation time, and the process proceeds to either step S70 or step S80 depending on whether the time is determined to be the information presentation time. In other words, prior to the determined information presentation time, the received road information is prevented from being presented in the host vehicle 10. The determined information presentation time corresponds to a time or distance of the host vehicle 10 from the portion 21 of the road 14 ahead of the current portion 12 of the road 14 upon which the host vehicle 10 is traveling.

The road information display system 54 allows the driver of the host vehicle 10 to receive road information regarding a portion 21 of the road 14 ahead of the current portion 12 of the road 14 on which the host vehicle 10 is traveling. Receiving the road information regarding the portion 21 of the road 14 ahead of the current portion 12 of the road 14 the host vehicle 10 is traveling allows the driver to understand the portion 21 of the road 14 prior to traveling that portion 21 of the road 14 and to prepare to control the host vehicle 10 along the portion 21 of the road 14 such that stress and risk are reduced. The received road information provides more descriptive and specific information than is available from traffic signs provided along the road 14. The received road information can be received responsive to a driver request in the host vehicle 10 or based on a current location of the host vehicle 10. The information presentation time can be determined based on at least one of a burden of the driver of the host vehicle 10 and a predetermined time or distance to the portion of the road ahead of the host vehicle 10. The driver can set a preference that the received road information is presented further away from or closer to the portion 21 of the road 14 ahead of the current portion 12 of the road 14 upon which the host vehicle 10 is traveling. The presentation time of the road information can also be earlier based on the urgency of the situation, such as an accident around the sharp turn 16 (FIG. 1) that is not visible to the driver of the host vehicle 10 prior to the sharp turn 16. Preferences regarding the timing and location of the presentation of the received road information can be set by the driver and stored in the storage 32A of the presentation determination unit 32. The camera 30A can determine a viewing angle of the driver 64 of the host vehicle 10 such that the heads-up display 56 of the visual image of the received road information is displayed proximate to the determining viewing angle of the driver, as shown in FIG. 7. The heads-up display 56 can also display the received road information such that the information overlies the portion 21 of the road 14 to indicate appropriate operation of the host vehicle 10, such as an area in which the brakes of the host vehicle should be applied.

The received road information provides more descriptive and specific information than is available from traffic signs provided along the road 14. The driver of the other vehicle 22 can record an audio message stored to the storage 50B to be transmitted to the host vehicle 10 when the host vehicle 10 approaches the portion 21 of the road 14 ahead of the current portion 12 of the road 14 upon which the host vehicle 10 is traveling. The driver of the other vehicle 22 can record a message informing the driver of the host vehicle 10 to watch out for construction around the sharp turn 16 (FIG. 1), or the direction in which an emergency vehicle is traveling. The sound can also be sound external to the other vehicle 22 transmitted to the storage 50B to be transmitted with the road information to the host vehicle 10. The operation history of a driver of the other vehicle 22 can be transmitted to the electronic communication network 24 to determine unknown risks along a portion of the road 14, and road information based on the operation history can be forwarded to the host vehicle 10 to facilitate operation of the host vehicle along the portion of the road 14.

Figure 6:
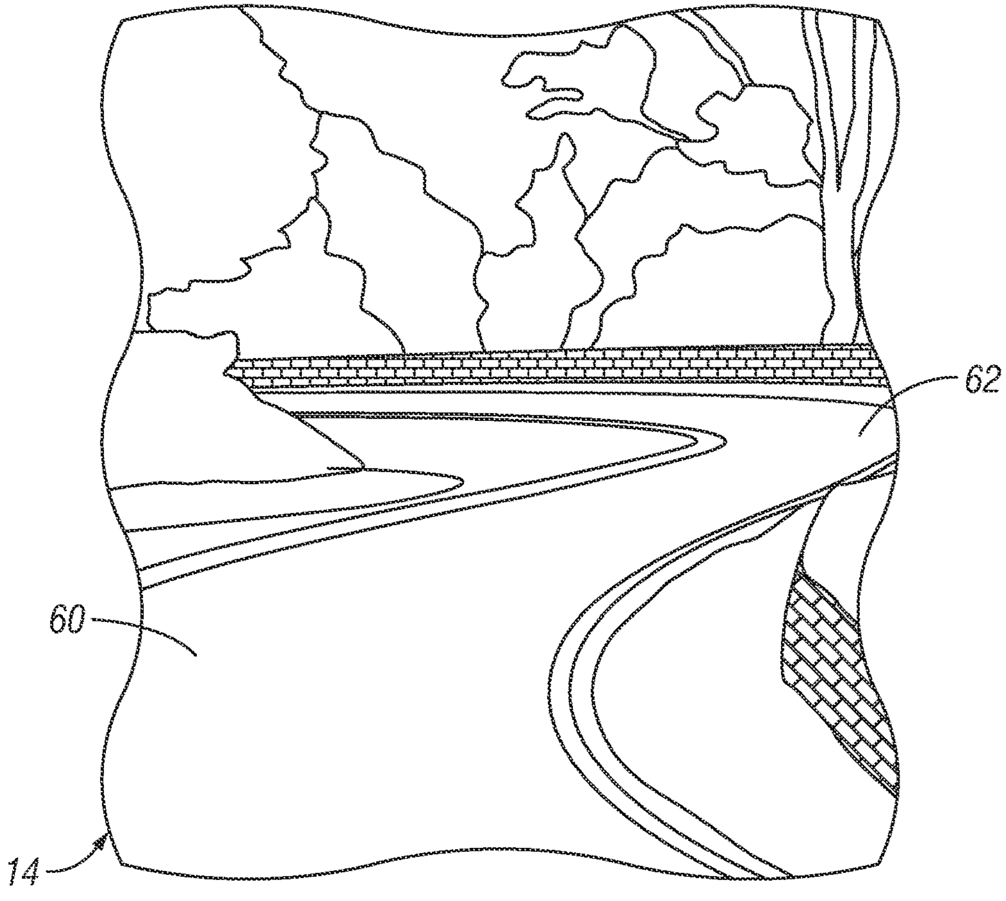
FIG. 6 is a perspective view of road information displayed in the host vehicle.

The road information is obtained from the other vehicle 22, as shown in FIG. 1. The other vehicle 22 is continuously obtaining road information as the other vehicle 22 travels along the road 14 and transmits the road information to the electronic communication network 24, as shown in FIGS. 3 and 4. The electronic communication network 24 transmits road information received from the other vehicle 22 traveling the portion of the road 14 ahead of the current location of the host vehicle 10. When another vehicle 22 is not traveling the portion of the road ahead of the current location of the host vehicle 10, the electronic communication network 24 transmits road information for the portion of the road 14 stored in the storage 50B of the information distribution unit 50. As shown in FIG. 5, the other vehicle 22 traveling the road 14 records and transmits road information regarding the sharp turn 16 in the road 14 prior to the host vehicle 10 traveling the sharp turn 16. The driver of the other vehicle 22 can add a voice message indicating a steep drop off at the sharp turn 16. As shown in FIG. 6, the other vehicle 22 traveling the road 14 records and transmits road information regarding the series of turns 60 and 62 in the road 14 prior to the host vehicle 10 traveling the series of turns 60 and 62.

The road information display system 54 can include a learning function to facilitate displaying the received road information based on big data gathered from many other vehicles 22 using the road information display system 54. The data of the received road information and the results of displaying the road information in the host vehicle are uploaded to the electronic communication network, such as a cloud server, and machine learning is conducted. The evaluation of the learning function can be based on the extent of the driver's burden, which is measured by the sensor disposed in the host vehicle 10, or a response time of the driver of the host vehicle 10.

The road information display system 54 can also be used when driving on a circuit. Racing and/or time trial drivers can receive the road information such that the driver is aware of an upcoming situation, such as a turn, to prepare the driver for the situation, thereby improving the driver's time and increasing the driver's safety. The system architecture illustrated in FIG. 4 can be simplified when used by a host vehicle driving on a circuit by removing the information distribution unit 50 because the road information obtained by the other vehicle 22 is transmitted to the electronic communication network 24 and to the host vehicle 10 only in real time. In other words, road information from the other vehicle 22 is not stored in the storage 50B of the information distribution unit 50 for future use by the host vehicle 10.

Each of the wireless communicators 42A, 46A and 52A includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, or Bluetooth communications or any other type of signal suitable for wireless communications as understood in the vehicle field. Here, the wireless communication communicator can be a two-way wireless communication unit having a receiver and a transmitter.

Each of the storages 32A, 40C, 50B and 44F can be any non-transitory computer readable medium, such as a ROM device, a RAM device, a hard disk, a flash drive, cloud drive, etc. Storages 32A and 50A are configured to store settings, programs, data, calculations and/or results of the processor(s) 32B and 50A, respectively. Storages 40C and 44F are configured to store settings, programs, data, calculations and/or results of the road information request unit 40 and the information acquisition unit 44, respectively.

Each of the processors 30C, 32B, 48A and 50A can be any suitable programmable control device capable of executing instructions necessary to carry out or control the operation of the many functions performed by the respective units.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the road information display system and method. Accordingly, these terms, as utilized to describe the present invention should be interpreted relative to a vehicle equipped with the road information display system and method.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method of displaying road information in a host vehicle comprising:

determining a burden of the driver with a sensor disposed in the host vehicle;

receiving with the host vehicle the road information acquired by another vehicle, the road information including information about a portion of a road ahead of a current portion of the same road upon which the host vehicle is traveling;

storing the received road information in the host vehicle;

determining an information presentation time at which the road information is configured to be presented in the host vehicle, the information presentation time being determined based on the determined burden of the driver or based on a predetermined time or distance to the portion of the road ahead of the host vehicle, the predetermined time or distance being adjustable by the driver;

scheduling presentation of the received road information in the host vehicle at the determined information presentation time such that the received road information is not presented to the driver prior to the determined information presentation time;

transmitting a control signal with the processor at the determined information presentation time to display the received road information; and controlling the host vehicle, by the driver, in accordance with the presented road information.

2. The method according to claim 1, wherein the road information is received by the host vehicle responsive to a driver request in the host vehicle.

3. The method according to claim 1, wherein the road information is received by the host vehicle based on a current location of the host vehicle.

4. The method according to claim 3, wherein the road information acquired by the another vehicle is received from a remote server, the remote server requesting the road information from the another vehicle based on a current location of the another vehicle.

5. The method according to claim 4, wherein the remote server transmits the road information stored in a storage memory to the host vehicle upon determining the another vehicle is not currently traveling the portion of the road ahead of the current portion of the road upon which the host vehicle is traveling.

6. The method according to claim 5, wherein the road information is stored in the storage memory of the remote server for a predetermined amount of time.

7. The method according to claim 1, wherein the road information is presented in the host vehicle including at least one of a visual image and an audible message.

8. The method according to claim 7, wherein the visual image is modified to correspond to a current time of day or a current weather condition.

9. The method according to claim 7, further comprising determining a viewing angle of a driver, the visual image being displayed proximate to the determined viewing angle of the driver.

10. The method according to claim 1, wherein the road information acquired by the another vehicle includes at least one of a visual image and an audible message.

11. A road information display system for a host vehicle, comprising:

a receiver configured to receive road information acquired by another vehicle, the road information including information about a portion of a road ahead of a current portion of the same road upon which the host vehicle is traveling;

a storage configured to store the received road information;

a sensor disposed in the vehicle, the sensor being configured to determine a burden of the driver of the host vehicle;

a processor configured to determine an information presentation time, the processor being configured to determine the information presentation time based on the determined burden of the driver or based on a predetermined time or distance to the portion of the road ahead of the host vehicle, the predetermined time or distance being adjustable by the driver; and an information display configured to present the received road information in the host vehicle at the determined information presentation time, the processor being further configured to schedule presentation of the received road information in the host vehicle at the determined information presentation time such that the received road information is not presented prior to the determined information presentation time, the processor being further configured to transmit a control signal at the determined information presentation time to display the received road information, and the driver controlling the host vehicle in accordance with the presented road information.

12. The road information display system according to claim 11, wherein the information display includes at least one of a monitor and a speaker.

13. The road information display system according to claim 11, wherein the burden of the driver of the host vehicle is determined with a sensor disposed in the host vehicle.

14. The road information display system according to claim 11, wherein a transmitter transmits a request for the road information upon activation by a user of the host vehicle.

15. The road information display system according to claim 11, wherein a transmitter transmits a request for the road information based upon a current location of the host vehicle.

* * * * *